United States Patent [19]

Upmeier

[11] 3,709,290

[45] Jan. 9, 1973

[54] COOLING EQUIPMENT FOR TUBULAR PLASTICS FILM MADE BY A BLOWHEAD

[75] Inventor: Hartmut Upmeier, Tecklenburg, Germany

[73] Assignee: Windmoller & Holscher, Lengerich of Westphalia, Germany

[22] Filed: Dec. 4, 1970

[21] Appl. No.: 95,025

[30] Foreign Application Priority Data

Dec. 4, 1969 Germany....................P 19 60 962.2
Feb. 24, 1970 Germany....................P 20 08 597.6

[52] U.S. Cl. ............................161/47, 18/14, 34/104
[51] Int. Cl................................................F24h 3/60
[58] Field of Search ................34/104; 165/47; 18/14

[56] References Cited

UNITED STATES PATENTS

| | | |
|---|---|---|
| 3,064,905 | 11/1962 | Bunner....................................18/14 |
| 3,170,011 | 2/1965 | Cheney et al............................18/14 |

*Primary Examiner*—Charles Sukalo
*Attorney*—Fleit, Gipple & Jacobson

[57] ABSTRACT

Cooling equipment for tubular plastic film made by a blowhead, comprising an external air cooling ring for mounting between the blowhead and a position where the film has solidified, the air outlet from said external ring being directed onto the outside of the tubular film, a supply conduit and a withdrawal conduit, both extending axially through the blowhead, for the passage of internal cooling air, and an annular nozzle at the outlet of the supply conduit, the outlet of said nozzle being directed onto the interior surface of the film in such a way that the interior and exterior streams of cooling air impinge on the film at substantially the same level.

6 Claims, 2 Drawing Figures

COOLING EQUIPMENT FOR TUBULAR PLASTICS FILM MADE BY A BLOWHEAD

The invention relates to cooling equipment for tubular plastics film made by a blowhead.

In the manufacture of thick-walled tubular films of the kind required for making plastics sacks and carrier bags, various requirements must be kept in mind, such as close tolerances for the thickness and width of the film, the ability of the film to be flattened evenly and the prevention of the sides of the film from sticking to one another. Various cooling systems have been developed for fulfilling these requirements, either working with water or with air as the cooling medium. Cooling of the film with water is carried out either by contact with a cooling bulb disposed within the film or by means of contacting cylinders or cooling spirals surrounding the outside of the film or by direct water spraying with the aid of spraying nozzles or annular showers. These various forms of water cooling usually result in the film having uneven properties caused by the unduly sudden quenching of the film whilst still in the plastic state.

Cooling of the film with air is regarded better in theory. The normal construction involves a cooling ring arranged above the blowhead for the film but this brings about only limited cooling and therefore the output of the blowhead is uneconomically low. Various suggestions have been made to improve the cooling effect. For example, the air could be refrigerated but this gives rise to high investment and running costs. Also, since most plastics are poor heat conductors and therefore aggrevate the cooling problem, the practical effect of refrigerating the air is quite small.

An obvious development has therefore been to use the internal air that is employed for blowing the tubular film to bubble form as it emerges from the blowhead nozzle also for the purpose of cooling the interior surfaces of the film. Installations have been suggested which comprise a water-cooled and refrigerated heat exchanger in the interior of the tubular film and a circulating fan for the air blown into the film. It has been found, however, that the cooling effect of the heat exchanger is very limited. Above all, by reason of the lack of space within the tubular film, the performance of the circulating fan is so low that adequately high air speeds are not attainable whereas high air speeds are essential for obtaining a good cooling effect. What is more, in the same way as with film blowing equipment without interior cooling, such installations do not avoid the tendency of the film sides to stick to one another when the film is in a flattened condition, this giving rise to difficulties in the further processing of the film. Such tendency towards sticking is occasioned by the fact that in the air enclosed within the tubular film remnants of vapors, monomeric components, softeners and the like condense on the cooler portions of the film because they cannot escape from within the film.

A previous suggestion for cooling equipment made by the present applicants has been to provide for additional interior cooling of the film by means of air replacement through the blowhead. Since the interior air is replaced and provides a cooling effect, the output of the blowhead can be increased and there will be no tendency for the walls of the flattened tube to stick to one another. An optimum condition is obtained if the quantity of air passed into the film is approximately equal to the quantity of air used to cool the exterior of the film. Although such cooling equipment gives a far improved cooling effect, there will be no marked surface roughness which is sometimes desired on the interior surfaces of the film, especially when the film is being used for making adhesively constructed plastics bags or the like.

It is known that surface roughness on the exterior as well as the interior of tubular films can be produced by cooling the respective nozzle ring with water or oil because under these conditions one can work according to the so-called melt fracture process which will give rise to the desired surface roughness. What is disadvantageous is that the cooled rings will cause the melt to solidify whenever the extruder is at a standstill and therefore there will be severe damage caused by excessively high pressures if the extruder is carelessly started again. Further, the efficient passage of the cooling medium through the blowhead is rather problematic and the conduits for the cooling medium also make it difficult to dismantle the blowhead for cleaning purposes. Still further, the vapors remaining within the film in this process still give rise to sticking of the flattened film.

It is known that a rough surface can be produced on the outside of the film if a stream of air is impinged on the film directly above the nozzle orifice, such surface roughness being enhanced by cooling the nozzle ring. However, the amount of air that is blown onto the film cannot be increased at will to increase the cooling effect because the plastic film has a very low strength and will become so constricted under the dynamic pressure of the air stream that it might even sever from the nozzle orifice. Further, no matter how strong the cooling effect may be on the outside of the film, the interior surface remains unaffected. This interior surface is usually as smooth as a mirror because the internal ring of the nozzle has a temperature corresponding to the temperature of the plastics material; consequently, the resultant film will have a tendency to stick when flattened.

The invention aims to provide air cooling equipment in which the desired surface roughness is obtained on the exterior as well as the interior of the film and severing of the tube from the nozzle orifice is unlikely. According to the invention, cooling equipment for tubular plastics film made by a blowhead comprises an external air cooling ring for mounting between the blowhead and a position where the film has solidified, the air outlet from said external ring being directed onto the outside of the tubular film, a supply conduit and a withdrawal conduit, both extending axially through the blowhead, for the passage of internal cooling air, and an annular nozzle at the outlet of the supply conduit, the outlet of said nozzle being directed onto the interior surface of the film in such a way that the interior and exterior streams of cooling air impinge on the film at substantially the same level.

Since the interior and exterior cooling air impinges on the film as a sharp jet and at approximately the same position, the dynamic pressure of the exterior cooling air is balanced by the dynamic pressure of the interior cooling air, thereby making it possible to increase the air flow and thus the cooling effect without damaging the film. The sharp impact of the air on both sides of the film provides the desired surface roughness which facilitates subsequent glueing but counteracts the tendency of the film sides to stick to one another when the film is flattened. In addition, the circulation of interior cooling air ensures that vapors and the like are removed from within the tubular film.

The direction in which the air is ejected from the outlet of the external ring and/or annular nozzle can be slightly inclined towards the blowhead nozzle, this providing particularly intensive cooling of the nozzle rings which, in turn, contributes towards increased roughness of the film. Further, it is desirable for the widths of the outlets of the external ring and annular nozzle and the pressures in the supply and withdrawal conduits to be such that the dynamic pressures of the interior and exterior air streams are substantially equal.

In a preferred form of the invention, the supply conduit is formed by an annular passage and the withdrawal conduit is a pipe extending through the annular passage, preferably concentric therewith. In such a construction the internal ring of the nozzle will also form the lower interior cooling ring. In this way the interior nozzle ring will be particularly intensively cooled. The cooling air flows into the tubular film through the outer annular passage of the hole in the blowhead and is led off by the pipe extending centrally through the annular passage.

The external diameter of a guide ring for the internal cooling air may be substantially equal to the diameter of the blowhead nozzle. The film will then be supported by the cooling air pressed between the inside of the film and the guide ring without fear of sticking or tearing. Interior surface roughness will thereby be achieved to any desired extent, more so if the diameter of the guide ring is increased.

It is desirable if the annular passage is lined with heat insulating layers. This avoids undesirable heating of the cooling air by the hot walls of the hole through the blowhead.

Two examples of the invention are illustrated in the accompanying diagrammatic drawings, wherein.

Figure 1:
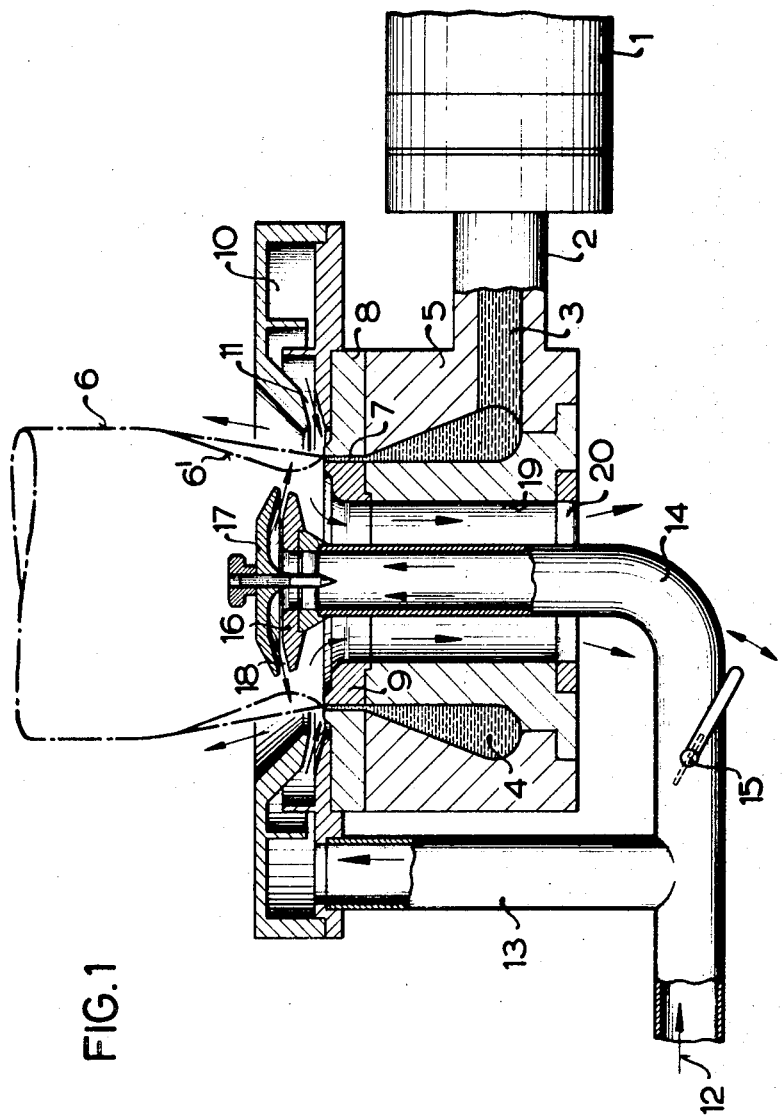
FIG. 1 is an axial section through a first embodiment.

Referring to FIG. 1, molten plastics material leaves an extruder 1 through the passage 3 of a connecting member 2 and reaches a distributor 4 which is illustrated in simplified form as an annular distributing passage in a blowhead housing 5 which is also diagrammatically illustrated. A nozzle orifice 7 through which the plastics material passes to form a tubular film 6 is formed by nozzle rings 8 and 9. The outer ring 8 supports a cooling ring 10 having a preferably downwardly inclined annular outlet 11 for guiding exterior cooling air onto the film 6 immediately above the nozzle ring 8.

Cooling air is introduced by a blower (not shown) in the direction of the arrow 12. Some of it passes through a conduit 13 into the cooling ring 10 to serve as exterior cooling air. The remainder flows through a pipe 14 and an internal cooling ring 16, 17 which has an outlet 18 that is preferably also downwardly inclined but may extend radially so that the air jet from the interior cooling ring strikes the interior of the film 6 at about the same level as the exterior jet of air from the outlet 11. The pipe 14 is fitted with a throttle flap 15 which controls the amount of inflation of the film 6.

If interior cooling were other than in accordance with the present invention, the sides of the film 6 would become constricted as shown at 6' in chain-dotted lines under the influence of the exterior cooling air immediately above the blowhead nozzle. Such constriction is avoided by the dynamic pressure of the interior cooling air.

The interior cooling air escapes from within the film 6 by passing through an annular passage 19 in which the pipe 14 is mounted with the aid of streamlined holders 20.

The cooling equipment can be readily adapted to different nozzle diameters because the exterior cooling ring 10 as well as the parts 16, 17 of the interior cooling ring can be easily replaced. The air ratios at the nozzle can therefore be kept constant.

If the exterior cooling ring is disposed some distance above the blowhead instead of supported directly by it, it will be an easy matter to extend the pipe 14 accordingly so that the interior air stream will impinge on the film at the same level as the exterior stream. In this case, however, there will be greater dependence on the dimensions of the blown film and cooling of the nozzle rings will no longer be possible.

Figure 2:
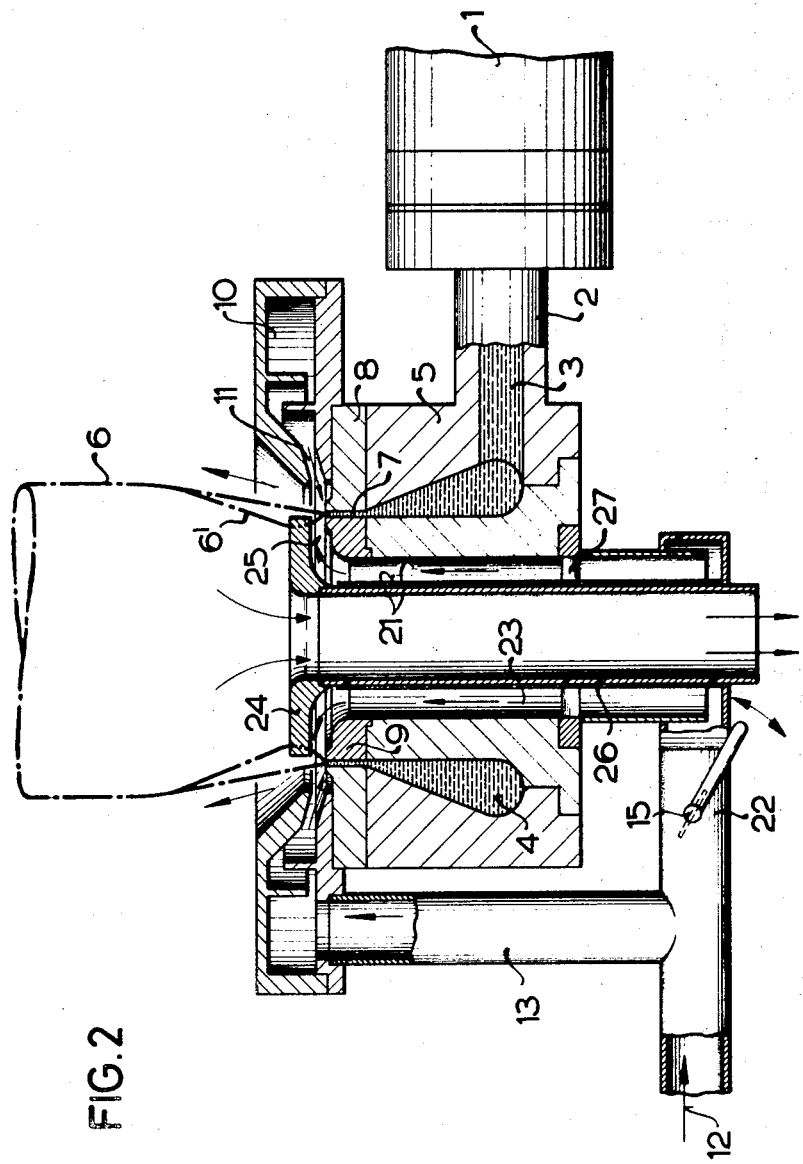
FIG. 2 is a similar view of a preferred embodiment.

In the case of FIG. 2, the same reference numerals are used as in FIG. 1 except for the parts mentioned hereunder. In this embodiment, the interior cooling air flows through a pipe 22 and annular passage 23 towards an interior cooling ring 24 of which the outlet 25 is directed radially outwardly. The lower ring of the interior air nozzle is thus formed by the inner nozzle ring 9 of the blowhead which is directly swept by the cooling air and therefore cooled. The interior cooling air escapes from the film 6 through a pipe 26 which is mounted in the passage 23 by means of streamlined holders 27.

The cooling ring 10 is readily replaced and so is the ring 24 and consequently the cooling equipment can be easily adapted to different nozzle diameters so that the air conditions at the nozzle remain constant.

Undesired heating of the cooling air within the annular passage 23 can be minimized by means of heat insulation 21 shown in broken lines. This insulation can, for example, be formed by one or more layers of thin corrugated illuminium reflecting film.

I claim:

1. A blowhead for making tubular plastic film comprising: means to cool said film, said cooling means comprising an external air cooling ring for mounting between the blowhead and a position where the film has solidified, said cooling ring having an annular discharge passage in its inner periphery being directed onto the outside of the tubular film; a supply conduit extending axially through the blowhead for supplying internal cooling air; a withdrawal conduit extending axially through the blowhead for withdrawing internal cooling air; and an internal annular nozzle at the outlet of the supply conduit, said internal annular nozzle having an annular discharge passage in its outer periphery, said discharge passage being directed onto the interior surface of the film in such a way that the interior and exterior streams of cooling air impinge on the film at substantially the same level.

2. Cooling equipment according to claim 1, wherein the outlet of said external ring and/or said annular nozzle are slightly inclined towards the blowhead nozzle.

3. Cooling equipment according to claim 1, wherein the widths of the outlets of the external ring and annular nozzle and the pressures in the supply and withdrawal conduits are designed so that the dynamic pressures of the interior and exterior air streams are substantially equal.

4. Cooling equipment according to claim 1, wherein the supply conduit is formed by an annular passage and the withdrawal conduit is a pipe extending through the annular passage.

5. Cooling equipment according to claim 4, wherein the external diameter of a guide ring for the internal cooling air is substantially equal to the diameter of the blowhead nozzle.

6. Cooling equipment according to claim 4, wherein the annular passage is lined with heat insulating layers.

* * * * *